United States Patent [19]

Olson et al.

[11] 4,184,116
[45] Jan. 15, 1980

[54] COMMUNICATION SYSTEM HAVING ANALOG-TO-DIGITAL-TO-ANALOG CONVERSION MEANS

[75] Inventors: Ernest E. Olson, Mount Prospect; Marvin J. Kreuser, Schaumburg, both of Ill.

[73] Assignee: Argos Products Company, Inc., Chicago, Ill.

[21] Appl. No.: 785,319

[22] Filed: Apr. 7, 1977

[51] Int. Cl.² .............................................. H02B 1/00
[52] U.S. Cl. ...................................... 325/30; 325/145; 325/320; 325/163
[58] Field of Search ................... 325/30, 55, 145, 148, 325/320, 163; 340/347 AD

[56] References Cited

U.S. PATENT DOCUMENTS

| | | | |
|---|---|---|---|
| 3,105,938 | 10/1973 | Onnigan | 325/145 |
| 3,330,909 | 7/1976 | Willson | 325/30 |
| 3,716,865 | 2/1973 | Willmot | 325/145 |
| 3,719,779 | 3/1973 | Wilson | 325/30 |
| 3,746,794 | 7/1973 | Stifle | 325/30 |
| 3,794,928 | 2/1974 | Stump | 325/30 |
| 3,905,028 | 9/1975 | Wintz | 340/347 AD |
| 3,953,798 | 4/1976 | Sjostrand | 325/30 |
| 3,999,129 | 12/1976 | Kasson | 340/347 AD |
| 4,016,532 | 5/1977 | Rose | 325/30 |
| 4,020,286 | 4/1977 | Ceci | 340/347 AD |

FOREIGN PATENT DOCUMENTS 1382927   2/1975   United Kingdom ................ 179/110 A Primary Examiner—Robert L. Griffin
Assistant Examiner—Michael A. Masinick
Attorney, Agent, or Firm—Wegner, Stellman, McCord, Wiles & Wood

[57] ABSTRACT

A communication system having a transmitter section and a receiver section. The transmitter converts an analog signal into a succession of binary coded words of equal length. The words are spaced apart by a fixed period of time. The succession of binary coded words represents the amplitude of the analog signal and is converted into a corresponding succession of bursts of energy, each burst of energy representing a bit of the binary coded word and having either a frequency at F0, representing a "0" in the binary coded word, or a frequency F1, representing a "1". The receiver section of the communication system receives the succession of bursts of energy and converts it into a succession of binary coded words representative of the originally transmitted words. A digital-to-analog converter provides a signal representative of the original analog signal from the succession of binary coded words.

11 Claims, 5 Drawing Figures

Fig. 2. TRANSMITTER WAVE FORMS

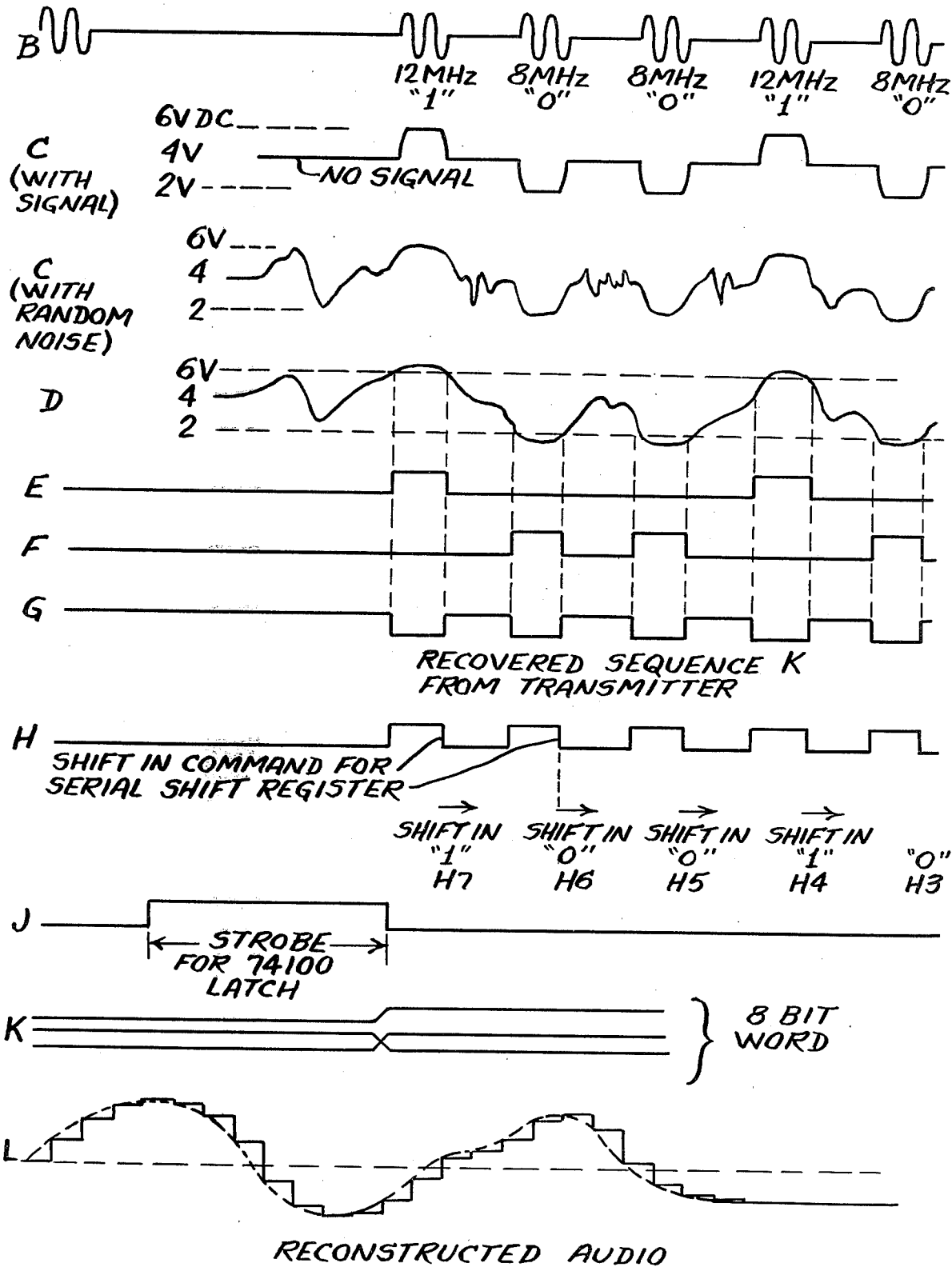

COMMUNICATION SYSTEM HAVING ANALOG-TO-DIGITAL-TO-ANALOG CONVERSION MEANS

BACKGROUND OF THE INVENTION

This invention relates to communication systems in general and, more particularly, to a communication system for transmitting information having a frequency within the audible range.

There exists a need for an inexpensive communication system which is low powered, has high fidelity and high reliability. Also, a system is needed which will not interfere with the operation of similar communication systems in the surrounding area.

Accordingly, we have developed a lower powered communication system having high fidelity which is simply and inexpensively constructed. Moreover, the transmitter portion of the communication system is small and compact and lends itself well to its use as a wireless microphone.

SUMMARY OF THE INVENTION

A transmitter portion of the communication system samples an analog signal representing information, as speech, music, or audible tones, and converts the analog signal into a succession of binary coded words which represent the amplitude of the sampled analog signal. The succession of binary coded words is converted into a corresponding succession of bursts of energy, each burst of energy representing a bit of the binary coded word and each burst of energy having either a frequency F0, representing a "0" F1, representing a "1" of the binary coded word. The succession of bursts of energy is received by a receiver which detects F0 and F1 and reconstructs the originally transmitted binary coded word from the F0 and F1 information. The reconstructed binary coded word is applied to a digital-to-analog converter to provide an analog signal representative of the originally transmitted analog signal. An audio tone may also be transmitted to operate a remote control switch.

It is a feature of the present invention to provide a communication system which operates on low power.

Another feature of the present invention is to provide a lower powered communication system which provides high fidelity and high reliability.

Another feature of the present invention is to provide a communication system which not only transmits and receives information within the audible range, but also transmits and receives an audible tone for remote control.

Other features and advantages will become apparent when considering the specification in combination with the drawing in which:

DRAWING

FIG. 4 is a diagram of waveforms taken at selected points of the system shown in FIG. 3.

DESCRIPTION OF PREFERRED EMBODIMENT

Figure 1:
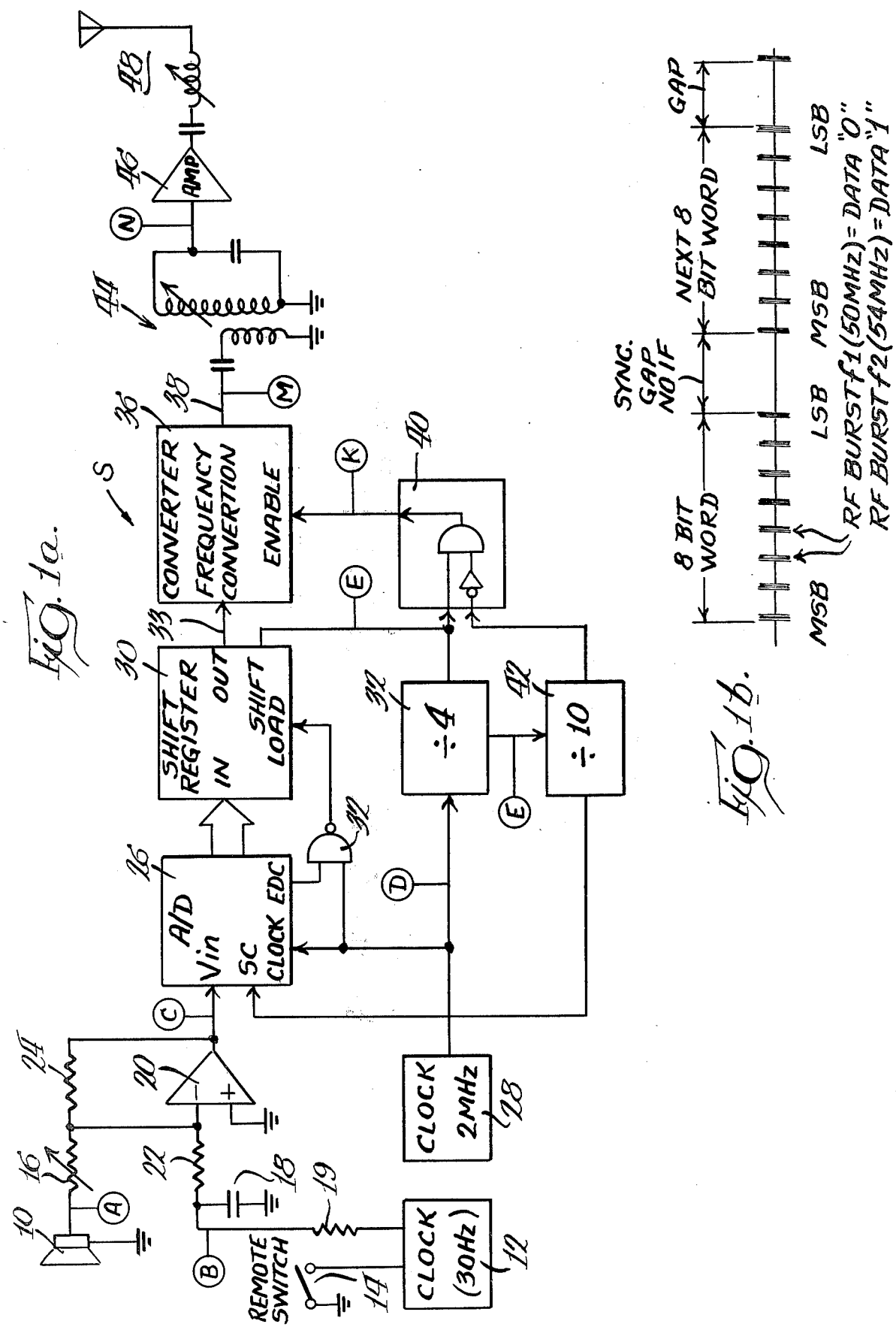
FIG. 1a is a block diagram of the transmitter section of the communication system.
FIG. 1b is a diagram of a typical 8-bit word and synchronizing gap.
Figure 2:
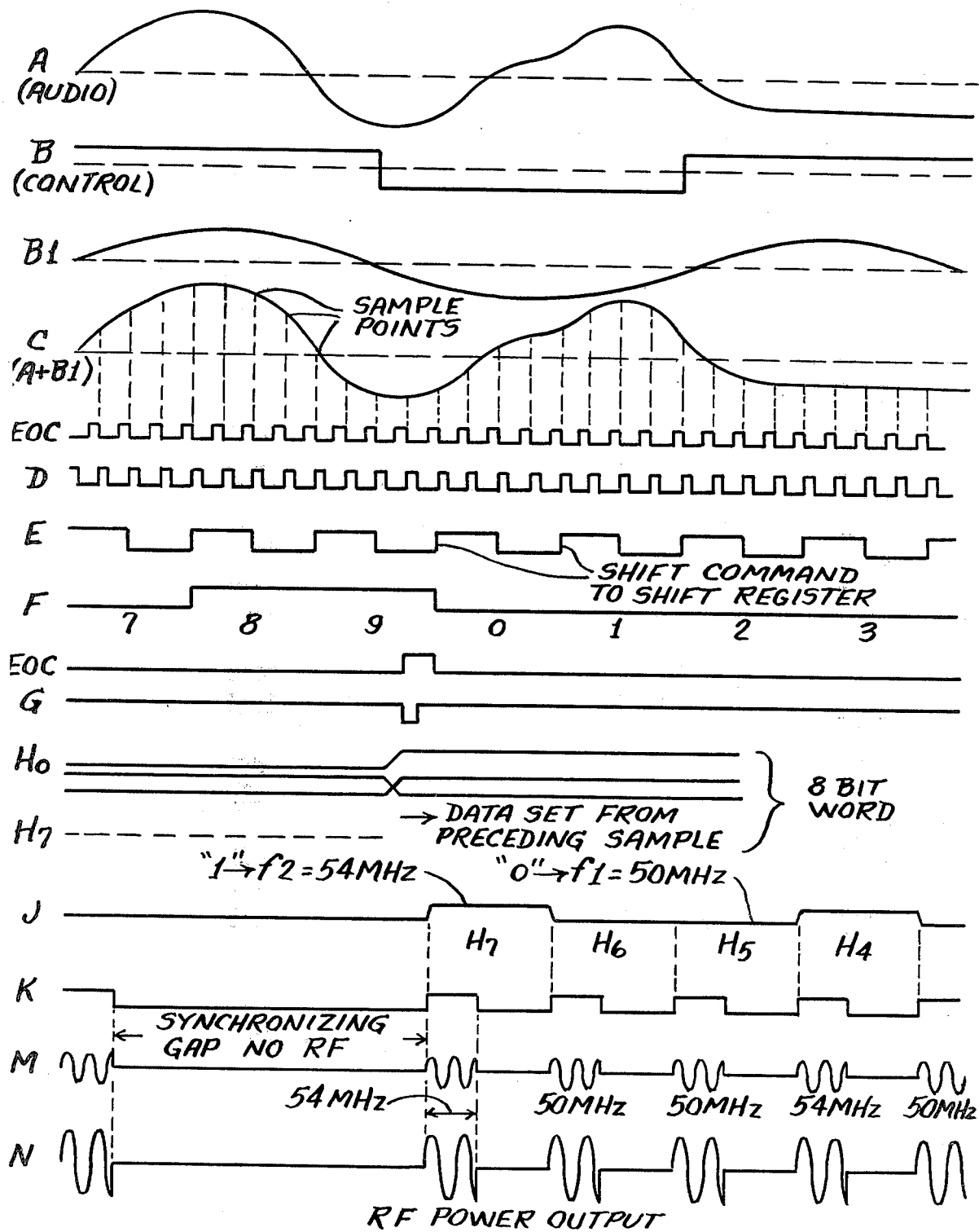
FIG. 2 is a diagram of waveforms selected at various points of the system shown in FIG. 1.

Referring to FIG. 1a the transmitter portion of the system will now be explained. During the discussion of the operation of the transmitter, various circuit component identification numbers will be given. Component identification is provided in an effort to assure a full and complete disclosure. However, it should be understood that similar components may be used in lieu of those specifically noted. Also, several waveforms, taken at various points throughout the circuit of FIG. 1a, are shown in FIG. 2. The waveforms may be correlated with FIG. 1a by the alphabetical notation.

The audio input to the transmitter may be provided by microphone 10 or by low frequency clock 12, typically 30 Hz, and operable by remote switch 14. The operator speaks into microphone 10 for voice transmission. Remote switch 14 permits remote control of ON-/OFF operations by depressing remote switch 14, as will become apparent from the following discussion.

Voice received through microphone 10 is converted into a current which passes through variable resistor 16 for volume control. The signal from microphone 10 is combined with a low frequency signal available from across capacitor 18 and resistor 19 and provided to the negative input of operational amplifier 20, HA2525. The positive input terminal to operational amplifier 20 is connected to ground. Feedback resistor 24 couples the output of the operational amplifier 20 to the negative input thereof. The audio information to be transmitted is provided to the Vin terminal of the A-to-D converter 26, MM5357. At the reception of a pulse at the SC (start conversion) input terminal of A-to-D converter 26, the voltage at the Vin terminal thereof is sampled at a rate determined by clock 28 (LL555), 2 MHz. Although the frequency is 2 MHz as shown, a lesser frequency may be used as long as the sampling rate is sufficient to maintain clear transmission of the signal.

A succession of 8-bit binary words is formed, as shown in FIG. 1b and the value of each word corresponds to the amplitude of the waveform at Vin when the sample is taken. Each 8-bit word is provided in parallel to the 8-bit shift register 30 which, upon the reception of a LOAD pulse from NAND gate 32, converts the 8-bit data to serial data on output line 33 starting with the most significant bit and ending with the least significant bit. The data is converted into serial form at a rate determined by the rate that the pulses are received on the SHIFT input of the shift register 30. Clock 28 is divided by divide-by-4 circuit 32, 7476, to shift the data at a 0.5 MHz rate. Thus, the information on output line 33 is a succession of 8-bit words clocked at a 0.5 MHz rate, and indicative of successive levels of the audio input as sampled. Converter 36, 74S124, serially receives the succession of 8-bit coded words and provides bursts of energy on output line 38 representing the individual "1" and "0" bits of the 8-bit word. Specifically, at the reception of pulses at the enable input of converter 36, a corresponding number of RF energy bursts is provided on output 38. One enable pulse is provided for each bit of the 8-bit word. The frequency of each burst of energy is determined by the value of each bit (i.e., "1" or "0") of the 8-bit word as received at the FREQ. CONV. input of converter 36. If the bit is "0", the burst of energy provided on output 38 has a frequency of F0, as 50 MHz, whereas the burst of energy provided on output 38 has a frequency of F1, as 54

MHz, if the bit which occurs during the enable pulse is a "1".

Gate 40, 74221, which provides the eight equally spaced enable pulses during the presence of the 8-bit binary coded word, also provides for equally spaced synchronizing gaps between adjacent words. The synchronizing gap and the enabling pulses are available by combining the output of the divide-by-4 circuit 32 with the output of the divide-by-10 circuit 42, 7490, as best seen in FIG. 2. The divide-by-10 circuit 42 also provides a pulse to the input SC of A-to-D converter 26.

The output 38 of the converter 36 is provided to an RF transformer section 44. The output of the RF transformer 44 is provided to RF power AMP 46, LH0002, and to antenna circuit 48 in the well known manner. As best seen in FIG. 1b, the output of the transmitter is a succession of 8-bit words spaced apart by a gap of a fixed distance wherein each 8-bit word represents the amplitude of the audio input, wherein an energy burst of F0 represents a "0", and an energy burst of F1 represents a "1".

Figure 3:
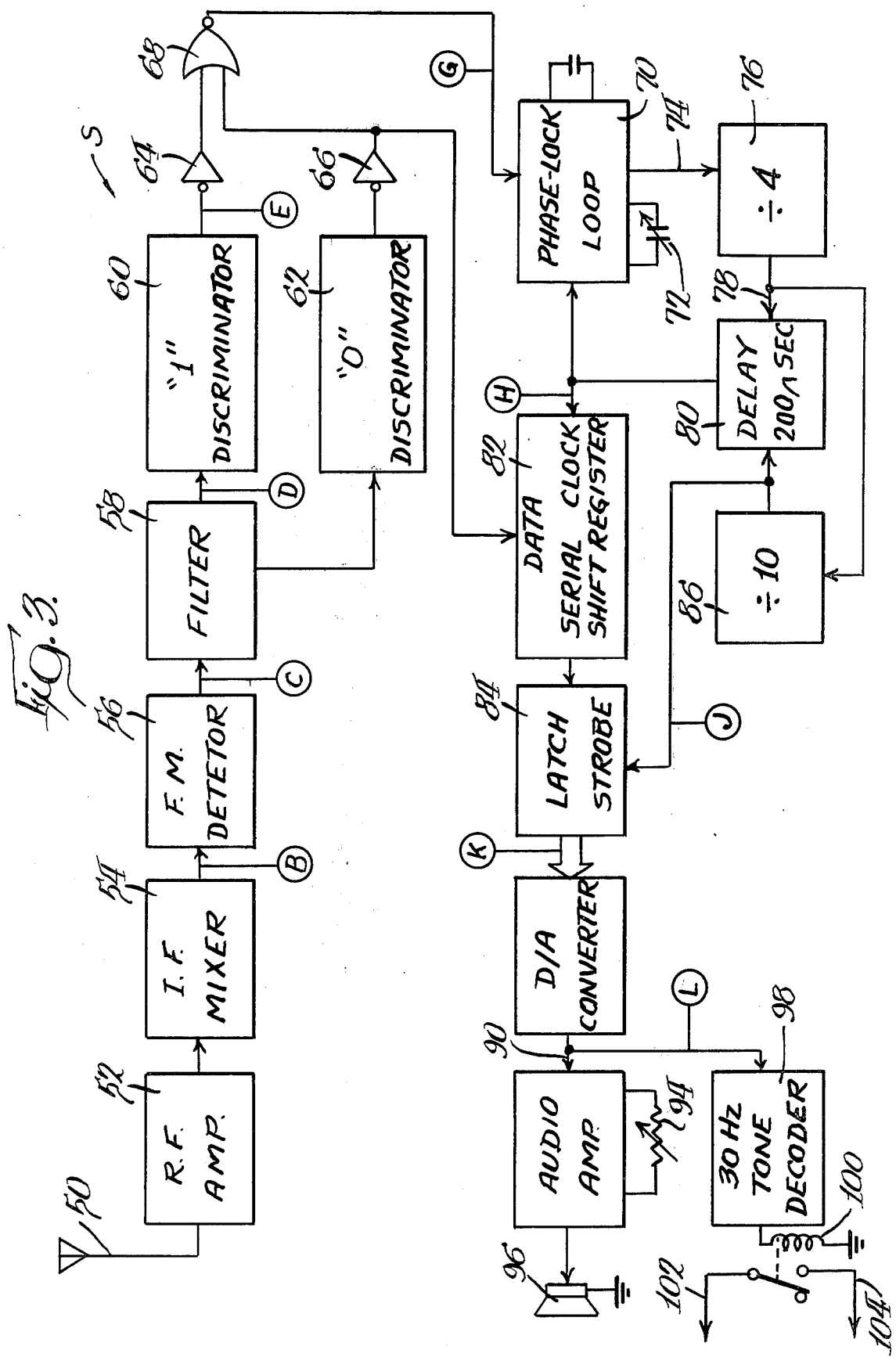
FIG. 3 is the receiver section of the communication system.

Referring to FIG. 3, the receiver section of the system is shown. While discussing the receiver section, reference will be made to FIG. 4 which depicts various waveforms throughout the receiver circuit. Again, correlation to FIG. 3 is provided by alphabetical notation. Also, the frequency values recited as well as other parameters for the receiver are selected for operation with the transmitter as shown in FIG. 1a. It will be apparent that other frequencies and other parameters will be equally capable of providing the required functions explained herein.

The signal of FIG. 1b is received by antenna 50 and amplified by RF amplifier 52, CA3005. The signal is applied to IF mixer 54, CA3005, having a 10 MHz IF frequency. The output of the IF mixer is a signal representative of the bursts of energy received by antenna 50. Specifically, with an IF of 10 MHz, a 50 MHz signal produces an 8 MHz signal and the 54 MHz signal produces a 12 MHz signal. Thus, the 8 MHz signal represents F0, and hence a "0", and the 12 MHz signal represents F1, and hence a "1", as best seen in FIG. 4. The output of the IF mixer 54 is provided to FM detector 56, CA3065. The FM detector provides two voltage levels each representing F0 and F1. Specifically, a voltage of 2 volts represents F0, whereas a voltage of 6 volts represents F1. Although the signal may contain a significant amount of random noise, FM detector 56 is sufficiently sensitive to provide the appropriate voltage level when the particular frequency F0 or F1 is received. The signal from the FM detector 56 is applied to filter 58, an RC network, to remove the random noise and the transients from the signal. The output of the filter 58 is provided to "1" discriminator 60 and "0" discriminator 62. The discriminators, each LM311, are voltage comparison circuits which provide a voltage output when the input voltage exceeds a specified level. Thus, "0" discriminator 62 is set for a threshold level of 2 volts, whereas one discriminator 60 is set for a threshold level of 6 volts. The outputs of the discriminators 60 and 62 are provided through inverters 64 and 66, respectively. The signals are combined by NOR gate 68 to provide a complete 8-bit word for clocking the data, as will be described in greater detail below.

Phase lock loop 70, NE-562, generates a 2 MHz signal. The 2 MHz frequency is established by the adjustment of capacitor 72. This frequency corresponds with the frequency of clock 28 in the transmitter section as shown in FIG. 1. The 2 MHz signal is provided on output line 74, and divide-by-4 circuit 76, SN7476 divides the 2 MHz signal by 4 to provide a 0.5 MHz signal on output 78. The 0.5 MHz signal on output 78 is applied to delay 80, 200η sec, SN74221. The output of delay 80 is returned to phase lock loop 70, thereby closing the loop, and to the CLOCK input of shift register 82. Thus, CLOCK input of shift register 82 receives a frequency equal to the frequency at which the original data was shifted through shift register 30 in the transmitter section of the system. The output of the shift register 82 occurs at a frequency equal to the clock frequency and the level of the signal on the output depends upon the value at the DATA input terminal of shift register 82. Specifically, the DATA input to shift register 82 may be coupled to the output of either the inverter 64 or 66 and, as shown in FIG. 3, is coupled to the output of inverter 66. The output of shift register 82, therefore provides a serial representation of the 8-bit word received from the most significant bit to the least significant bit. The serial data is provided to latch 84, SN74100, where it is converted into parallel form. A pulse on the strobe input to latch 84 clears the latch at the completion of receiving each 8-bit word. The signal provided to the strobe input is available from the divide-by-10 counter 86, SN7490. Thus, the latch is cleared at the same rate as the A-to-D converter 26 (in the transmitter section of the system) sampled the data. The 8-bit word in parallel form is provided D-to-A converter 88, DA1200. The D-to-A converter 88 generates a voltage, the amplitude of which is proportional to the value of the 8-bit word received from latch 84. The D-to-A converter maintains the amplitude for the width of each pulse and, upon the reception of the succeeding 8-bit word, is updated to the next amplitude. The output 90 is provided to audio amplifier 92 having a volume control 94 and the reconstructed audio is available on speaker 96. Output 90 is also coupled to the 30 Hz tone decoder 98, LM 567, which provides a current through the coil of relay 100 when a 30 Hz tone is received. Specifically, when remote switch 14 of the transmitter section as shown in FIG. 1 is depressed, and CLOCK provides a 30 Hz tone, this frequency is ultimately detected by the 30 Hz tone detector 98 to energize relay 100. Outputs 102 and 104 may be suitably coupled to movie projectors, light switches or other ON/OFF type devices for remote control thereof.

Thus, the communication system S provides for effectively maximum utilization of existing bandwidths of communication frequencies in a novel and simple manner.

The foregoing disclosure of specific embodiments is illustrative of the broad inventive concepts comprehended by the invention.

We claim:
1. A communication system comprising:
   means for converting an analog signal into a succession of binary coded words of equal length each word being made up of a series of bits spaced apart from each other by a first established time period, the words being spaced apart from each other by a second established time period greater than said first established time period wherein the succession of binary coded words represents the amplitude of the analog signal;
   means for converting the binary coded words into a succession of bursts of energy in serial form, each burst of energy representing a bit of the binary coded word and each burst of energy having either a frequency F0 representing a "0" bit in the word or a frequency F1, representing a "1" bit in the word;

means for transmitting the succession of bursts of energy;

means for receiving the succession of bursts of energy;

means for reconverting the succession of bursts of energy into a succession of received binary coded words; and means for reconverting the succession of received binary coded words into a signal representative of the analog signal.

2. The communication system of claim 1 wherein the means for converting an analog signal further includes:

means for sampling the analog signal at an established rate to form a succession of sampled signals; and means for providing one binary coded word for each sampled signal.

3. The communication system of claim 1 wherein the analog signal represents information having a frequency within the audible range.

4. The communication system of claim 1 wherein the binary coded word has eight bits.

5. The communication system of claim 1 wherein the analog signal is a tone of fixed frequency.

6. The communication system of claim 1 wherein the means for receiving the succession of bursts of energy, the means for reconverting the succession of bursts of energy into a succession of received binary coded words, and the means for reconverting the succession of received binary coded words into a signal representative of the analog signal comprise:

a receiver for receiving the succession of bursts of energy;

an FM detector coupled to the receiver for detecting whether a burst of energy is of a frequency F0 or of a frequency F1;

means for providing a first output pulse upon the reception of a burst of energy having a frequency F0 and a second output pulse upon the reception of a burst of energy having a frequency F1;

means for combining the first and second outputs for providing a synchronizing pulse for a phase lock loop;

shift register means coupled to the means for providing the first output pulse, said shift register means clocked by the phase lock loop to provide the succession of received binary coded words;

latch means for storing each binary coded word; and means coupled to the latch means for converting the succession of received binary coded words into a signal representative of the analog signal.

7. The communication system of claim 1 wherein the means for receiving the succession of bursts of energy and the means for recovering the succession of bursts of energy include:

means for detecting whether a burst of energy is of a frequency F0 or of a frequency of F1 to provide a detected signal; and means for converting the detected signal into a succession of binary coded words, each binary coded word composed of zeroes and ones representative of F0 and F1, respectively.

8. The communication system of claim 7 wherein the means for reconverting the succession of received binary coded words into a signal representative of the analog signal is a latch coupled to a digital-to-analog converter.

9. The communication system of claim 7 wherein said signal representative of the analog signal is a stepped waveform approximating the analog signal.

10. A communication system comprising:

means for converting an analog signal into a succession of binary coded words of equal length, the words being spaced apart from each other by an established time period wherein the succession of binary coded words represents the amplitude of the analog signal;

means for converting the binary coded words into a succession of bursts of energy in serial form, each burst of energy representing a bit of the binary coded word and each burst of energy having either a frequency F0 representing a "0" bit in the word or a frequency F1, representing a "1" bit in the word;

means for transmitting the succession of bursts of energy;

means for receiving the succession of bursts of energy;

means for reconverting the succession of bursts of energy into a succession of received binary coded words; and means for reconverting the succession of received binary coded words into a signal representative of the analog signal, said means for receiving the succession of bursts of energy and the means for reconverting the succession of bursts of energy including means for detecting the difference between a burst of energy having a frequency F0 and a burst of energy having a frequency of F1 to provide a detected signal, and means for converting the detected signal into a succession of binary coded words, each binary coded word composed of zeroes and ones representative of F0 and F1, respectively, said means for detecting including an FM detector to provide a first voltage representative of F0 and a second voltage representative of F1, and means responsive to the first voltage level and the second voltage level for providing a first output pulse upon the reception of a voltage equal to the first level and a second output pulse upon the reception of a voltage equal to the second voltage level.

11. The communication system of claim 10 further including:

means for combining the first output pulse with the second output pulse to provide a clocking signal for synchronizing a phase lock loop.

* * * * *